US010237163B2

(12) United States Patent
Jacob et al.

(10) Patent No.: US 10,237,163 B2
(45) Date of Patent: Mar. 19, 2019

(54) STATIC ROUTE ADVERTISEMENT

(71) Applicant: Juniper Networks, Inc., Sunnyvale, CA (US)

(72) Inventors: Sudhin Jacob, Bangalore (IN); Deepesh Sudhakaran Nair, Bangalore (IN); Sushant Kumar, Bangalore (IN); Arijit Paul, Cupertino, CA (US); Prasantha Kumar Gudipati, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 302 days.

(21) Appl. No.: 14/985,103

(22) Filed: Dec. 30, 2015

(65) Prior Publication Data
US 2017/0195210 A1   Jul. 6, 2017

(51) Int. Cl.
| | | |
|---|---|---|
| H04L 12/28 | (2006.01) | |
| H04L 12/715 | (2013.01) | |
| H04L 12/46 | (2006.01) | |
| H04L 12/721 | (2013.01) | |
| H04L 12/741 | (2013.01) | |
| H04L 29/08 | (2006.01) | |
| H04L 12/707 | (2013.01) | |
| H04L 12/703 | (2013.01) | |

(52) U.S. Cl.
CPC .......... *H04L 45/04* (2013.01); *H04L 12/4625* (2013.01); *H04L 12/4641* (2013.01); *H04L 45/26* (2013.01); *H04L 45/66* (2013.01); *H04L 45/74* (2013.01); *H04L 69/321* (2013.01); *H04L 45/22* (2013.01); *H04L 45/24* (2013.01); *H04L 45/28* (2013.01)

(58) Field of Classification Search
CPC ..... H04L 45/04; H04L 45/66; H04L 12/4625; H04L 45/26; H04L 69/321; H04L 45/74; H04L 12/4641
See application file for complete search history.

(56) References Cited

U.S. PATENT DOCUMENTS 7,710,902 B2 *  5/2010  Vasseur ............... H04L 12/4633
                                                                370/228
8,125,926 B1   2/2012  Kompella
(Continued)

OTHER PUBLICATIONS

Sajassi et al., "BGP MPLS-Based Ethernet VPN", Internet Engineering Task Force (IETF)—RFC 7432, ISSN: 2070-1721, Feb. 2015, 56pp.*

(Continued)

*Primary Examiner* — Lan-Huong Truong
(74) *Attorney, Agent, or Firm* — Shumaker & Sieffert, P.A.

(57) ABSTRACT

A network device operable as a provide edge router is described. The network device comprises one or more processors operably coupled to a memory; a configuration interface configured for execution by the one or more processors to receive configuration data configuring the network device as a provider edge router of an intermediate layer 3 network to provide multi-homed layer 2 virtual bridge connectivity to a customer edge device using an active-standby mode of operation; and a routing process configured for execution by the one or more processors to send, to a remote provider edge router in response to determining the network device is able to send layer 2 packets to the customer edge device, a route advertisement that includes a static route specifying a layer 3 address of the customer edge device as a next-hop for a layer 3 subnet.

21 Claims, 5 Drawing Sheets

(56) References Cited

U.S. PATENT DOCUMENTS

| | | | | |
|---|---|---|---|---|
| 8,787,149 | B1* | 7/2014 | Ramanathan | H04L 45/58 370/216 |
| 9,019,814 | B1 | 4/2015 | Mohanty et al. | |
| 9,055,000 | B1* | 6/2015 | Ghosh | H04L 45/66 |
| 9,599,951 | B2* | 3/2017 | Yamaguchi | G03G 21/1604 |
| 2004/0165600 | A1* | 8/2004 | Lee | H04L 12/462 370/395.53 |
| 2004/0223500 | A1* | 11/2004 | Sanderson | H04L 12/4641 370/395.53 |
| 2007/0140251 | A1* | 6/2007 | Dong | H04L 12/4645 370/392 |
| 2011/0032945 | A1* | 2/2011 | Mullooly | H04L 45/58 370/401 |
| 2012/0147737 | A1* | 6/2012 | Taylor | H04L 41/0663 370/219 |
| 2012/0230335 | A1* | 9/2012 | Filsfils | H04L 45/38 370/392 |

OTHER PUBLICATIONS

Sajassi et al., "BGP MPLS-Based Ethernet VPN", Internet Engineering Task Force (IETF)—RFC 7432, ISSN: 2070-1721, Feb. 2015, 56pp (Year: 2015).*

Sajassi et al., "Integrated Routing and Bridging in EVPN," L2VPN Workgroup Internet Draft, draft-ietf-bess-evpn-inter-subnet-forwarding-01, Oct. 18, 2015, 26pp (Year: 2015).*

Rabadan et al., "IP Prefix Advertisement in EVPN," draft-ieff-bess-evpn-prefix-advertisement-02, Bess Workgroup Internet-Draft, Sep. 14, 2015, 24 pp.

Weiguo et al., "Multi-homed network in EVPN," draft-hao-evpn-mhn-00.txt, Internet Engineering Task Force, IETF, Standard-Working-Draft, Jun. 13, 2013, 13 pp.

Extended Search Report from counterpart European Application No. 16204542.1, dated May 4, 2017, 11 pp.

Sajassi, et al., "Integrated Routing and Bridging in EVPN," Working Group Interent Draft, Oct. 18, 2015, 26 pp.

Sajassi, et al., "BGP MPLS-Based Ethernet VPN," Interent Engineering Task Force, RFC 7432, Feb. 2015, 56 pp.

Yong, et al., "Network Virtualization Edge (NVE)," Network Working Group Internet Draft, Feb. 13, 2014, 20 pp.

Rosen et al.,"BGP/MPLS IP Virtual Private Networks (VPNs)," Network Working Group, RFC 4364, Feb. 2006, 47 pp.

Response to Extended Search Report dated May 4, 2017, from counterpart European Application No. 16204542.1, filed Jan. 4, 2018, 30 pp.

Examination Report from counterpart European Application No. 16204542.1, dated Aug. 30, 2018, 4 pp.

Response to Examination Report dated Aug. 30, 2018, from counterpart European Application No. 16204542.1, filed Dec. 27, 2018, 6 pp.

* cited by examiner

STATIC ROUTE ADVERTISEMENT

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via traffic engineered label switched paths (LSP) through the intermediate network in accordance with one or more multiprotocol label switching (MPLS) protocols. In a typical configuration, provider edge (PE) devices (e.g., routers and/or switches) coupled to the customer edge (CE) network devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the network devices.

In an EVPN, MAC learning between PE devices occurs in the control plane rather than in the data plane (as happens with traditional bridging) using a routing protocol. For example, in EVPNs, a PE device typically uses the Border Gateway Protocol (BGP) (i.e., an L3 routing protocol) to advertise to other provider edge network devices the MAC addresses learned from the local customer edge network devices to which the PE device is connected. A PE device may use BGP route advertisement message to announce reachability information for the EVPN, where the BGP route advertisement specifies one or more MAC addresses learned by the PE device instead of L3 routing information.

In an EVPN configuration referred to as the active-standby EVPN multi-homing mode of operation, an Ethernet segment includes multiple PE devices that provide multi-homed connectivity for one or more local customer edge (CE) devices. Moreover, the multiple PE device provide transport services through the intermediate layer 3 network to a remote PE device, and each of the multiple PE devices in the Ethernet segment forwards Ethernet frames in the segment for the CE device. In the active-standby EVPN multi-homing mode of operation, only a single active PE router of the multi-homing PE routers is allowed to forward traffic to and from an Ethernet segment that make up the set of L2 links connecting the multi-homed CE device with the multi-homing PE routers. When a network failure occurs at the active one of the multiple PE devices that provide multi-homed connectivity, the active PE device assumes a role of a standby PE device and one of the standby PE devices switches to become the active PE device.

SUMMARY

In general, techniques are described for suppressing advertisements of static routes configured in a multi-homing provider edge router that is operating in standby mode for an Ethernet VPN (EVPN). For example, multiple provider edge (PE) routers of an intermediate layer 3 (L3) network may be configured to provide an EVPN to multiple customer edge (CE) devices connected to the PE routers, which provide L2 virtual bridge connectivity between the CE devices. The multi-homed CE device may in some cases provide reachability for an L3 subnet of a local customer network that includes one or more host devices. Each of the multi-homing PE routers may therefore be configured with a common static route specifying an L3 address for the multi-homed CE device as a next-hop for the L3 subnet. In order to provide reachability for the L3 subnet while avoiding black holing at the one or more standby PE routers, the standby multi-homing PE routers suppress advertisement of the static route and only the active multi-homing PE router advertises the static route to the remote PE routers also configured to provide the EVPN.

In some instances, each PE router of the multi-homing PE routers determines whether to advertise the static route based on a success or failure of an L2 address request such as an Address Resolution Protocol (ARP) request or Neighbor Discovery Protocol (NDP) neighbor solicitation. The request is originated by the PE router and requests the L2 address of an L3 address for the multi-homed CE device that is the next-hop for the L3 subnet, as specified in the static route. The PE router attempts to send (e.g., broadcast) the request on the EVPN bridge domain formed by the links that constitute the Ethernet segment. If the PE router receives a reply responsive to such a request, then the CE device is reachable by the PE router via the Ethernet segment and the PE router advertises the static route to the remote PE routers also configured to provide the EVPN. If, however, a reply is not received, this indicates the PE router is a standby or non-designated forwarder for the EVPN, and the PE router therefore suppresses advertisement of the static route.

As a result, the remote PE routers do not receive an advertisement for the static route from standby multi-homing PE routers and therefore avoid sending, across the intermediate L3 network, packets destined for host devices within the L3 subnet to the standby multi-homing PE routers, where such packets would be dropped by the standby multi-homing PE routers since the standby multi-homing PE routers are not allowed to forward traffic to the Ethernet segment by which the CE device is reached. Instead, the remote PE routers send the packets to the active multi-homing PE router, which forwards the packets via the Ethernet segment to the CE device. Furthermore in some cases, if a previously-designated standby PE router transitions to the role of an active multi-homing PE router, the now-active multi-homing PE router begins advertising the static route to the remote PE routers to cause the remote PE routers to begin sending traffic to the now-active multi-homing PE router.

In some examples, a method includes receiving, by a provider edge router of an intermediate layer 3 network, configuration data configuring the provider edge router to provide multi-homed layer 2 virtual bridge connectivity to a customer edge device using an active-standby mode of operation; and sending, by the provider edge router to a remote provider edge router in response to determining the provider edge router is able to send layer 2 packets to the customer edge device, a route advertisement that includes a static route specifying a layer 3 address of the customer edge device as a next-hop for a layer 3 subnet.

In some examples, a non-transitory computer-readable medium comprising instructions for causing one or more programmable processors of a provider edge router of an intermediate layer 3 network to: receive configuration data configuring the provider edge router to provide multi-homed layer 2 virtual bridge connectivity to a customer edge device using an active-standby mode of operation; and send, to a remote provider edge router in response to determining the provider edge router is able to send layer 2 packets to the customer edge device, a route advertisement that includes a static route specifying a layer 3 address of the customer edge device as a next-hop for a layer 3 subnet.

In some examples, a network device is operable as a provide edge router, comprising: one or more processors operably coupled to a memory; a configuration interface configured for execution by the one or more processors to receive configuration data configuring the network device as a provider edge router of an intermediate layer 3 network to provide multi-homed layer 2 virtual bridge connectivity to a customer edge device using an active-standby mode of operation; and a routing process configured for execution by the one or more processors to send, to a remote provider edge router in response to determining the network device is able to send layer 2 packets to the customer edge device, a route advertisement that includes a static route specifying a layer 3 address of the customer edge device as a next-hop for a layer 3 subnet.

The details of one or more embodiments are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
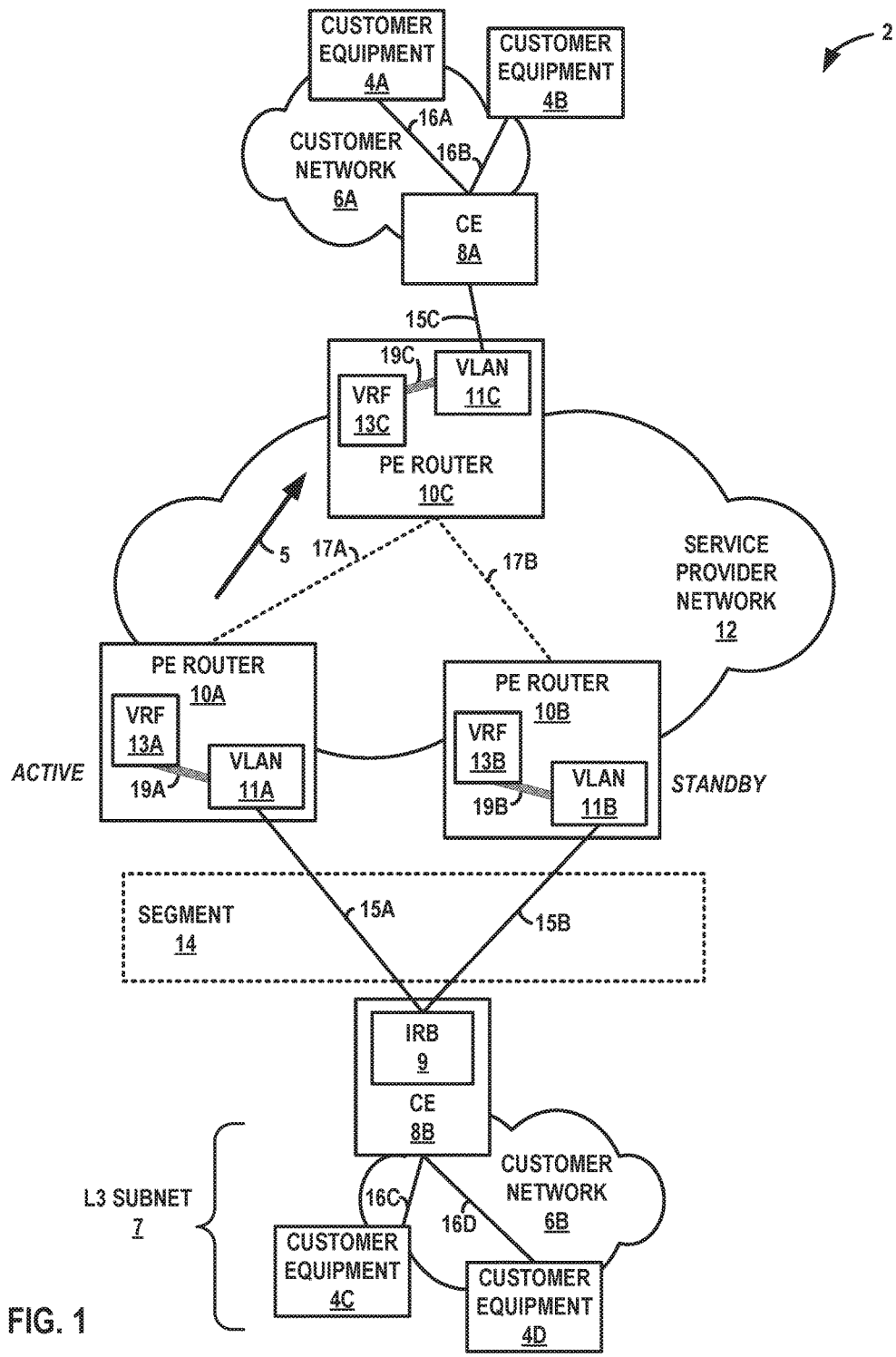
FIG. 1 is a block diagram illustrating an example system, in accordance with techniques of the disclosure.

FIG. 1 is a block diagram illustrating an example system, in accordance with techniques of the disclosure. In the example of FIG. 1, PE routers 10A-10C ("PE routers 10" or, more simply, "PEs 10") provide customer devices 4A-4D ("customer devices 4") associated with customer networks 6A-6B ("customer networks 6") with access to an intermediate layer 3 (L3) network (here, "service provider network 12") via customer edge (CE) devices 8A-8B ("CEs 8"). Communication links 16A-16G may be Ethernet, ATM or any other suitable network connections.

PE routers 10 and CEs 8 may each represent a router, switch, or other suitable network devices that participates in a layer two (L2) virtual private network (VPN) (L2VPN) service, such as an Ethernet Virtual Private Network (EVPN). Customer networks 6 may be networks for geographically separated sites of an enterprise. Each of customer devices 4 may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely exemplary. For example, an enterprise may include any number of customer networks 6. Nonetheless, for ease of description, only customer networks 6A-6B are illustrated in FIG. 1.

Service provider network 12 may represent a computer network that is owned and operated by a service provider, which is usually large telecommunications entity or corporation. Service provider network 12 represents an L3 computer network, where reference to a layer followed by a number refers to a corresponding layer in the Open Systems Interconnection (OSI) model. Service provider network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other. In some cases, service provider network 12 represents a data center L2/L3 switching fabric (or "data center fabric network") that interconnects CEs for a tenant of the data center.

Service provider network 12 may include a variety of network devices other than PE routers 10. For instance, service provider network 12 may include a route reflector, one or more provider routers (also known as "P" or "core" routers), switches, and so forth. In some examples, the route reflector (not shown) may reside within service provider network 12 and along a path in a service provider network between two or more PE routers. Because of an internal BGP (IBGP) full-mesh requirement, some networks may use route reflectors to simplify configuration. Using a route reflector, routers are grouped into clusters, which are identified by numeric identifiers unique to an autonomous system (AS). Within the cluster, a BGP session is configured from a single router (the route reflector) to each internal peer. With this configuration, the IBGP full-mesh requirement may be met by the route reflector. To use route reflection in an AS, one or more routers are designated as a route reflector—typically, one per point of presence (POP). Route reflectors have the BGP ability to re-advertise routes learned from an internal peer to other internal peers. Rather than requiring all internal peers to be fully meshed with each other, route reflection may have only the route reflector be fully meshed with all internal peers.

Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes L2 EVPN service. An EVPN is a service that provides a form of L2 connectivity across an intermediate L3 network, such as service provider network 12, to interconnect two L2 customer networks, such as L2 customer networks 6, that are usually located in two different geographic areas. Often, EVPN is transparent to the customer networks in that these customer networks are not aware of the intervening intermediate service provider network and instead act and operate as if these two customer networks were directly connected and formed a single L2 network. In a way, EVPN enables a form of a transparent LAN connection between two geographically distant customer sites that each operates a L2 network and, for this reason, EVPN may also be referred to as a "transparent LAN service."

To configure an EVPN, a network operator of the service provider configures, via configuration or management interfaces, various devices included within service provider network 12 that interface with L2 customer networks 6. The EVPN configuration may include an EVPN instance (EVI), which consists of one or more broadcast domains. Generally, an EVI may refer to a routing and forwarding instance on a PE router, such as any of PE routers 10A-10C. Consequently, multiple EVIs may be configured on PE routers 10 for Ethernet segment 14, as further described herein, each providing a separate, logical layer two (L2) forwarding domain. In this way, multiple EVIs may be configured that each includes one or more of PE routers 10A-10C of Ethernet segment 14. In some examples, Ethernet Tags are then used to identify a particular broadcast domain, e.g., a VLAN, in an EVI. A PE router may advertise a unique EVPN label per-<ESI, Ethernet Tag> combination. This label assignment methodology is referred to as a per-<ESI, Ethernet Tag> label assignment. Alternatively, a PE router may advertise a unique EVPN label per MAC address. In still another example, a PE router may advertise the same single EVPN label for all MAC addresses in a given EVI. This label assignment methodology is referred to as a per-EVI label assignment.

In the example of FIG. 1, for use in transporting communications associated with one or more EVIs, the network operator configures PE routers 10 to provision pseudowires 17A-17B for transporting L2 communications. Pseudowires are logical network connections formed from two unidirectional label switched paths (LSPs) that emulate a connection not natively offered by service provider network 12 for consumption outside the boundaries of that service provider network 12. Pseudowires may emulate a L2 connection within service provider network 12 enabling service provider network 12 to offer emulated L2 connectivity externally for consumption by L2 customer networks 6. As such, each EVPN instance may operate over pseudowires 17 to enable a virtual or logical form of L2 connectivity between customer networks 6.

To configure an EVI, pseudowires 17 may be configured such that each of PE routers 10 that provide a given EVI is interconnected by way of pseudowires to every other one of the PE devices participating in the EVI. In the example of FIG. 1, each of PE routers 10 provides access to the EVPN for carrying traffic associated with customer networks 6 and, therefore, each of PE devices 10 within the same Ethernet segment may be connected to every other PE device 10 via pseudowires 17. Once pseudowires are configured in this manner, EVPN may be enabled within PE devices 10 to operate over the pseudowires, which may in this context operate as logical dedicated links through service provider network 12. In operation, EVPN generally involves prepending or otherwise inserting a tag and a pseudowire label onto incoming L2 packets, which may also be referred to as L2 frames (particularly in the context of Ethernet), and transmitting the tagged packets through a corresponding one of the configured pseudowires. Once EVPN is configured within service provider network 12, customer devices 4 within customer networks 6 may communicate with one another via EVPN as if they were directly connected L2 networks.

In order to establish the EVPN, an EVPN protocol executing on PE routers 10A-10C triggers EVPN designated forwarder (DF) election for Ethernet segment 14. This may be done, for example, by the EVPN protocol executing on each of PE routers 10A-10C that participates in the Ethernet segment directing the router to output a routing protocol message advertising an Ethernet Segment Identifier (ESI), which is typically unique across all EVPN instances (EVIs). In addition, for each EVI, the EVPN protocol directs the router to output a routing protocol message advertising an Ethernet Auto-Discovery (AD) route specifying the relevant ESI for the Ethernet segment coupled to the EVPN instance. Once the EVPN is operational for the {EVI, ESI} pair, PE routers 10A-10C output routing protocol messages to remote PE router 10D to announce media access control (MAC) addresses associated with customer equipment in customer network 6B.

For example, in typical operation, PE routers 10A-10C communicate using the Border Gateway Protocol (BGP) and the EVPN protocol specifies BGP Network Layer Reachability Information (NLRI) for the EVPN and may define different route types for conveying EVPN information via the BGP routing protocol. The EVPN NLRI is typically carried in BGP using BGP Multiprotocol Extensions. An Ethernet Segment route advertised by each PE router 10A-10C using BGP includes a Route Distinguisher and Ethernet Segment Identifier. An Ethernet AD route advertised by each PE router 10A-10C for each EVI, specifies a Route Distinguisher (RD) (e.g., an IP address of an MPLS Edge Switch (WS)), ESI, Ethernet Tag Identifier, and MPLS label. Subsequent BGP media access control (MAC) routes output by PE router 10A-10C announce MAC addresses of customer equipment 4 for the EVPN and include a RD, ESI, Ethernet Tag Identifier, MAC address and MAC address length, IP address and IP address length, and MPLS label. Additional example information with respect to the EVPN protocol is described in "BGP MPLS-Based Ethernet VPN," Request for Comments (RFC) 7432, Internet Engineering Task Force (IETF), and February, 2015, the entire contents of which are incorporated herein by reference.

In the example of FIG. 1, when providing the EVPN service to customer networks 6, PE routers 10 and CEs 8 perform MAC address learning to efficiently forward L2 network communications in system 2. That is, as PE routers 10 and CEs 8 forward Ethernet frames, the routers learn L2 state information for the L2 network, including MAC addressing information for customer equipment 4 within the network and the physical ports through which customer equipment 4 are reachable. PE routers 10 and CE 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10 learn the MAC address for customer equipment 4 reachable through local attachment circuits, the PE routers 10 utilize MAC address route advertisements of a layer three (L3) routing protocol (i.e., BGP in this example) to share the learned MAC addresses and to provide an indication that the MAC addresses are reachable through the particular PE router that is issuing the route advertisement. In the EVPN implemented using PE routers 10 for a given EVI, each of PE routers 10 advertises the locally learned MAC addresses to other PE routers 10 using a BGP route advertisement, also referred to herein as a "MAC route" or a "MAC Advertisement route." As further described below, a MAC route typically specifies an individual MAC address of customer equipment 4 along with additional forwarding information, such as a route descriptor, route target, layer 2 segment identifier, MPLS label, etc. In this way, PE routers 10 use BGP to advertise and share the MAC addresses learned when forwarding layer two communications associated with the EVPN. Accordingly, PE routers 10 may perform both local learning and remote learning of MAC addresses.

Each of PE routers 10 uses MAC routes specifying the MAC addresses learned by other PE routers to determine how to forward L2 communications to MAC addresses that belong customer equipment 4 connected to other PEs, i.e., to remote CEs and/or customer equipment behind CEs operatively coupled to PE routers. That is, each of PE routers 10 determine whether Ethernet frames can be sent directly to a particular one of the other PE routers 10 or whether to treat the Ethernet frames as so called "BUM" traffic (Broadcast, Unidentified unicast or Multicast traffic) that is to be flooded within the EVPN based on the MAC addresses learning information received from the other PE routers.

As shown in FIG. 1, CEs 8 may be multi- and/or singly-homed to one or more of PE routers 10. In EVPN, a CE may be said to be multi-homed when it is coupled to two physically different PE routers on the same EVI when the PE routers are resident on the same physical Ethernet Segment. CE 8B is coupled to PE routers 10A and 10B via links 16D and 16E, respectively, where PE routers 10A and 10B are capable of providing access to EVPN for L2 customer network 6B via CE 8B. In instances where a given customer network (such as customer network 6B) may couple to service provider network 12 via two different and, to a certain extent, redundant links, the customer network may be referred to as being "multi-homed." In this example, CE 8B may be multi-homed to PE routers 10A and 10B because CE 8B is coupled to two different PE routers 10A and 10B via separate and, to a certain extent, redundant links 15A and 15B where both of PE routers 10A and 10B are capable of providing access to EVPN for L2 customer network 6B. Multi-homed networks are often employed by network operators so as to improve access to EVPN provided by service provider network 12 should a failure in one of links 15A and 15B occur. In a typical EVPN configuration, only the multi-homing PEs 10A-10B participate in DF election for each ESI. PE 10C not connected to the ESI has no direct knowledge of the DF election result for a give ESI.

In an active-standby EVPN mode of operation in which only one of PE routers 10A or 10B forwards network traffic from PE router 10C to CE 8B, the EVPN protocol executing on each PE router 10A-10B initiates EVPN DF election for the Ethernet segment 14 on a per-EVPN instance basis, and participates within that election for each EVPN instance. That is, DF election may be at the granularity of each ESI, EVI combination. If elected DF, one of PE routers 10A-10B elected as DF forwards traffic from the EVPN to local CE 8B. In the active-standby EVPN mode of operation, the active multi-homing PE is also the designated forwarder.

An EVPN, such as illustrated in FIG. 1, may operate over an Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using a MPLS protocol, each router along an LSP allocates a label and propagates the label to the closest upstream router along the path. Routers along the path add or remote the labels and perform other MPLS operations to forward the MPLS packets along the established path.

As shown in the example of FIG. 1, service provider network 12 may provide an MPLS core for sending network packets from customer network 6A to and from customer network 6B. Each of PE routers 10A-10C implement the MPLS protocol and apply one or more MPLS labels, i.e., a label stack, to network packets in accordance with routing and forwarding information configured at each respective PE router. In an EVPN, a label stack applied to a network packet may include multiple labels. For instance, a label stack may include an outer label and an inner label.

The outer label serves as a "transport label" that uniquely identifies a PE router in an MPLS core. That is, each of PE routers 10A-10C may exchange control plane messages at configuration and startup that specify an outer label that uniquely identifies each respective PE router. For instance, PE router 10A may send control plane messages that specify an outer label that identifies PE router 10A to PE routers 10B-10C. PE routers 10B-10C may configure their respective forwarding units such that network packets that include the outer label corresponding to PE router 10A are forwarded to PE router 10A.

The inner label, or "service label," of the MPLS label stack provides EVPN-specific configuration information. As described above, EVPN defines Ethernet AD routes, MAC advertisement routes, and Ethernet Segment routes. An Ethernet AD route, for example, may be structured according to the following format of Table 1:

TABLE 1

AD route advertisement

Route Descriptor (8 octets)
Ethernet Segment Identifier (10 octets)
Ethernet Tag ID (4 octets)
MPLS Alias Label (3 octets)

In one example, PE router 10A may send an Ethernet AD route to PE router 10C initially at startup and configuration that includes an MPLS label as shown above. PE router 10C may configure one or more of its forwarding units to apply the MPLS label of the Ethernet AD route from PE router 10A as the inner label in a label stack applied to network packets that are destined to PE router 10A. PE router 10C would then apply the transport label identifying PE router 10A as the outer label in the label stack. In this way, the inner label provides EVPN-specification configuration information about the Ethernet AD route that PE router 10C uses to forward network packets through the EVPN.

In some configurations, to provide flexibility and scalability, multiple bridge domains can be defined within a particular EVPN instance (EVI). Likewise, one or more EVIs can be associated with a single L3 VPN virtual routing and forwarding instance (VRF). For example, each customer of the service provider network (or data center tenant) may be assigned a unique VRF; a customer/tenant can encompass one or more EVPN instances and one or more bridge domains (e.g., VLAN or VxLAN) per EVPN instance. To support this model, each configured bridge domain (including the default bridge domain for an EVPN instance) requires a IRB logical interface to perform the L2 and L3 functions. Each local bridge domain or local IRB interface for a PE router 10 maps to a unique IP subnet in the VRF for the PE router 10. IRB interfaces may be configured on each configured bridge domain including the default bridge domain for an EVPN instance.

In some examples, one or more of PE routers 10 may embed Network Virtualization Edge (NVE) functionality within the respective PEs, as described in "Network Virtualization Edge (NVE)," Feb. 13, 2014, https://tools.ietforg/html/draft-yong-nvo3-nve-03, which is hereby incorporated by reference herein in its entirety. In some examples, a PE that implements NVE functionality may be referred to as an NVE device.

As shown in FIG. 1, PEs 10A-10C include respective VRFs 13A-13C ("VRFs 13") for an EVPN instance that includes customer networks 6. Generally, VRFs permits multiple routing tables to exist within a single physical router. An attachment circuit may be associated with a particular VRF, and the particular VRF may be configured to forward traffic for the attachment circuit. VRFs 13 may be configured to include functionality described in "BGP/MPLS IP Virtual Private Networks (VPNs)," February 2006, https://tools.ietf.org/html/rfc4364, which is hereby incorporated by reference herein in its entirety.

As shown in FIG. 1, Virtual Local Area Networks (VLANs) may be configured for PEs 10. Accordingly, PEs 10 may forward network packets to between customer networks 6 using the bridge domain defined by the VLANs.

As shown in FIG. 1, PEs 10A-10C may are configured with respective VLANs instances 11A-11C. Each instance may represent functionality implemented by the respective PE for forwarding network packets within one or more layer 2 subnetworks identified by a corresponding VLAN identifiers.

PEs 10 also implement integrated routing and bridging, which supports layer-2 bridging and layer-3 routing on the same interface. As such, integrated routing and bridging allows a router to route local packets to another routed interface or to another bridging domain that has a layer-3 protocol configured. Integrated Routing and Bridging (IRB) interfaces (or "IRBs") are logical interfaces that enable a PE or CE to recognize which packets are being sent to local addresses so that they are bridged whenever possible and are routed only when needed. Accordingly, IRBs may be used to locally route inter-subnet traffic. For instance, using one or more IRBs, a PE may route inter-subnet traffic between multiple VLANs configured for multiple IRBs for a routing instance of the PE.

In the example of FIG. 1, each of PEs 10 is illustrated as having a single IRB 19 associated with a VRF 13 and having a VLAN-based bridging domain of a VLAN 11. PE 10A includes IRB 19A with the VLAN 11A bridging domain; PE 10B includes IRB 19B with the VLAN 11B bridging domain; and PE 10C includes IRB 19C with the VLAN 11C bridging domain. PE 10A, e.g., may be configured with multiple IRBs associated with VRF 13A and having different VLAN-based bridging domains and, accordingly, may route traffic between the VLANs using the multiple IRBs. One or more of PEs 10 may implement IRB as described in "Integrated Routing and Bridging in EVPN", ietf-bess-evpn-inter-subnet-forwarding, Oct. 18, 2015, https://tools.ietforg/html/draft-ietf-bess-evpn-inter-subnet-forwarding-01, which is hereby incorporated by reference herein in its entirety.

CE 8B is configured with IRB 9 having a bridging domain that provides L2 reachability to L3 subnet 7 that includes customer equipment 4C, 4D. The IRB 9 may be configured with a L3 address (e.g., an IPv4/IPv6 address) that is within the bridging domains for IRBs 19A, 19B, such that the IRB 9 routing interface for CE 8B is reachable by the routing interfaces for IRBs 19A, 19B. In this way, IRB 9 provides L2/L3 reachability to L3 subnet 7 from PEs 10A, 10B.

Each of PEs 10A, 10B is configured with a common static route that specifies the L3 address for IRB 9 as a next-hop for L3 subnet 7. More specifically, each of VRFs 13 may be configured with a common static route that specifies the L3 address for IRB 9 as a next-hop for L3 subnet 7. The static routes configured in PEs 10A, 10B for L3 subnet 7 are "common" in that the static routes both specify the L3 address for IRB 9 as a next-hop for L3 subnet 7. A static route is a route that is defined as static and generally does not change except by manual configuration. The static route in a VRF 13 may be inserted into the forwarding table when the next-hop (i.e., the L3 address for IRB 9) is reachable. Packets received by VRFs 13 of PEs 10 are forwarded to the next-hop address for transit. A static route may be more preferred by the route selection processes of PEs 10, relative to routes received by the PEs in routing protocol messages (for instance). Static routes may not be flushed from the routing table as a result of timeout or otherwise having become stale, as are routes received in routing protocol messages.

In accordance with techniques described in this disclosure, in order to advertise reachability for the L3 subnet 7 while avoiding black holing at the one or more standby PE routers, the standby multi-homing PE 10B suppresses advertisement of the static route for L3 subnet 7. Only the active multi-homing PE 10A advertises, with route advertisement 5, the static route for L3 subnet 7 to the remote PE 10C also configured with the EVPN instance illustrated in FIG. 1. Route advertisement 5 may represent a message according to a Border Gateway Protocol (BGP). For example, route advertisement 5 may represent a Multiprotocol-BGP (MP-BGP) UPDATE message that includes a Network Layer Reachability Information (NLRI) that includes the static route. Route advertisement may specifies a route target (RT) imported by VRF 13C. VRF 13C may add the static route advertised in route advertisement 5 to its routing table. As a result, packets destined for any of the hosts within L3 subnet 7, and received at VRF 13C of PE router 10C for the EVPN instance that includes customer network 6A, are forwarded by PE router 10C to PE router 10A for output on the bridging domain of IRB 19A toward IRB 9 of CE 8B.

Because PE 10B is a standby router in the active-standby EVPN mode of operation for the EVPN instance that includes customer networks 6, PE 10B does not advertise the static route for the L3 subnet 7. PE 10C does not, as a result, receive the static route from PE 10B and therefore does not forward packets destined for hosts within L3 subnet 7 to PE 10B. Because PE 10B is a standby router for such packets (associated with the EVPN instance), in this way, PE 10B does not black hole such packets and black holing may be avoided.

In other words, if multiple multi-homing PEs were to advertise a common static route to a remote PE, a BGP best path selection algorithm performed by the remote PE would select only the lowest loopback address for the multi-homing PEs which all advertised the static route. If the selected static route, which as received at the remote PE has the advertising multi-homing PE as a next-hop, is from multi-homing PE on standby mode, then the remote PE directs all packets matching the selected static route to the standby multi-homing PE, which drops the packets. This results in packet black holing and serious issues in the network. However, if only one static route is configured in the active multi-homing PE, when the access link from the active multi-homing PE to the multi-homed CE is down, then the subnet for the static route becomes isolated. By operating according to the techniques described above and configuring a common static route in each of the multi-homing PE routers, but suppressing routing protocol advertisements for the static route if the multi-homing PE is operating in standby mode, the packets may be directed from the remote PE to the active multi-homing PE.

In some instances, each of PEs 10A, 10B of the multi-homing PEs 10 for CE 8 determines whether to advertise the static route based on a success or failure of a request for an L2 address of an L3 interface that provides reachability to L3 subnet 7, where the request may include an Address Resolution Protocol (ARP) request or, in the case of IPv4, Neighbor Discovery Protocol (NDP) neighbor solicitation. The request is originated by the PE and requests the L2 address of an L3 interface for the multi-homed CE 8 that is the next-hop for the L3 subnet, as specified in the static route. The PE 10 attempts to send (e.g., broadcast) the request on the EVPN bridge domain of the Ethernet segment 14. If the PE 10 receives a reply (ARP reply or Neighbor Advertisement) responsive to such an request, then the CE device is reachable by the PE via Ethernet segment 14 and the PE advertises, by sending route advertisement 5, the static route to the remote PE 10C also configured to provide the EVPN. If, however, a reply is not received, this indicates the PE 10 is a standby or non-designated forwarder for the EVPN, and the PE 10 therefore suppresses advertisement of the static route.

As a result, the remote PE 10C does not receive an advertisement for the static route from standby multi-homing PE 10B and therefore avoids sending, across the intermediate L3 network, packets destined for host devices within the L3 subnet 7 to the standby multi-homing PE 10B, where such packets would be dropped by the standby multi-homing PE 10B since the standby multi-homing PE 10B is not allowed to forward traffic to Ethernet segment 14 by which the CE 8 is reached. Instead, the remote PE 10C sends the packets to the active multi-homing PE 10A, which forwards the packets via Ethernet segment 14 to the CE 8. Furthermore in some cases, if failover occurs and a previously-designated standby PE 10B transitions to the role of an active multi-homing PE as a result of failure of the previous active PE 10A, the now-active multi-homing PE 10B begins advertising the static route to the remote PE 10C to cause the remote PE 10C to begin sending traffic to the now-active multi-homing PE 10B.

Figure 2:
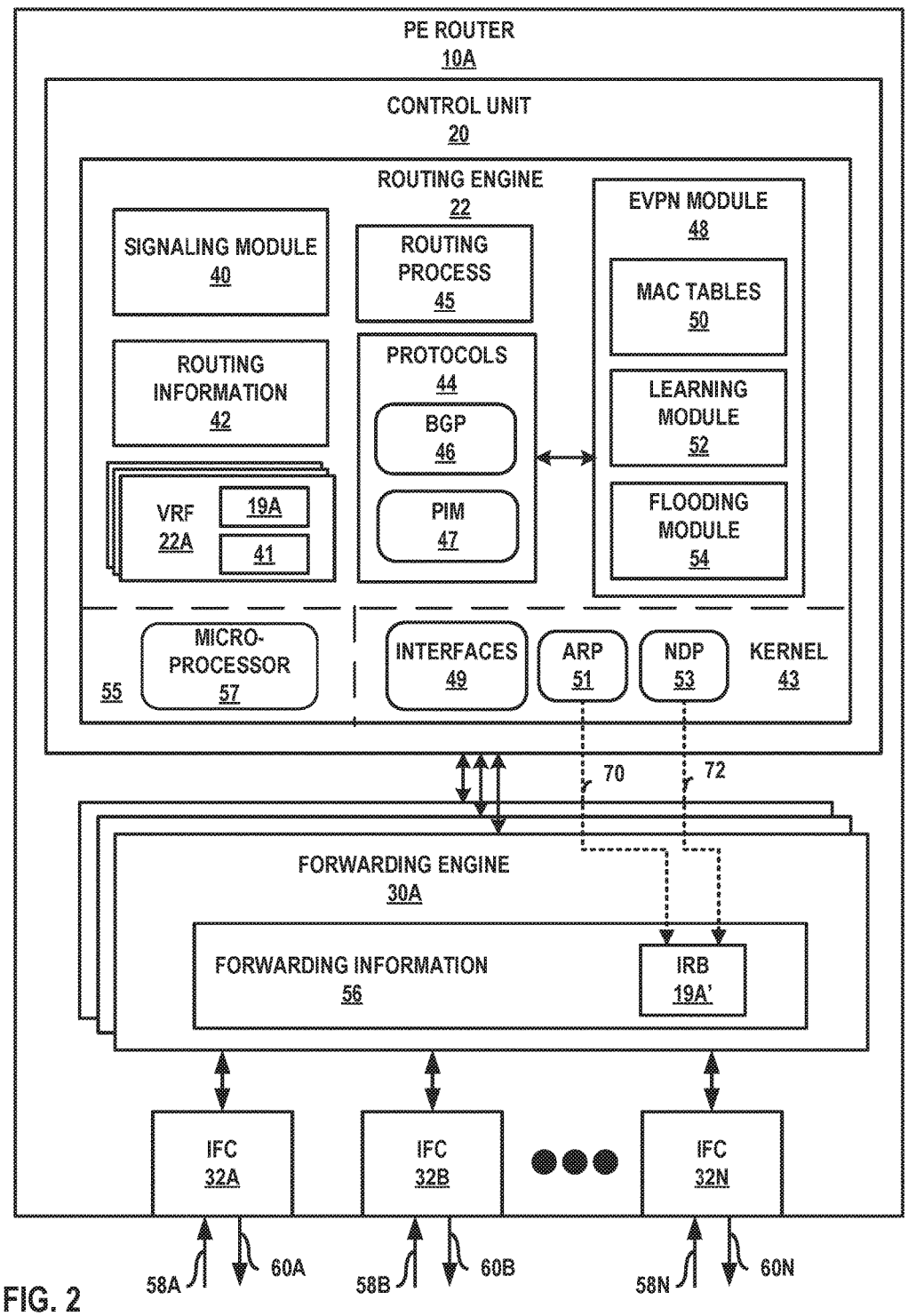
FIG. 2 is a block diagram illustrating further details of a network device that implements techniques to suppress static route advertisement.

FIG. 2 is a block diagram illustrating further details of a network device that implements techniques to suppress static route advertisement, in accordance with techniques of the disclosure. PE 10A includes a control unit 20 that includes a routing engine 22, and control unit 20 is coupled to forwarding engines 30A-30N. Each of forwarding engines 30 is associates with one or more of interface cards 32A-32N ("IFCs 32") that receive packets via inbound links 58A-58N ("inbound links 58") and send packets via outbound links 60A-60N ("outbound links 60"). IFCs 32 are typically coupled to links 58, 60 via a number of interface ports (not shown). Inbound links 58 and outbound links 60 may represent physical interfaces, logical interfaces, or some combination thereof.

Elements of control unit 22 and forwarding engines 30 may be implemented solely in software, or hardware, or may be implemented as combinations of software, hardware, or firmware. For example, control unit 20 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 20 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE router 10A, e.g., protocols. Control unit 20, in some examples, retrieves and executes the instructions from memory for these aspects.

Routing engine 22 includes kernel 43, which provides a run-time operating environment for user-level processes. Kernel 43 may represent, for example, a UNIX operating system derivative such as Linux or Berkeley Software Distribution (BSD). Kernel 43 offers libraries and drivers by which user-level processes may interact with the underlying system. Hardware environment 55 of routing engine 22 includes microprocessor 57 that executes program instructions loaded into a main memory (not shown in FIG. 2) from a storage device (also not shown in FIG. 2) in order to execute the software stack, including both kernel 43 and processes executing on the operating environment provided by kernel 43. Microprocessor 52 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 43 provides an operating environment for a routing process 45 that executes various protocols 44 at different layers of a network stack. For example, routing engine 22 includes network protocols that operate at a network layer of the network stack. In the example of FIG. 2, network protocols include the Border Gateway Protocol (BGP) 46, which is a routing protocol. BGP 46 may include Multiprotocol BGP (MP-BGP). Routing engine 22 may include other protocols not shown in FIG. 2. Routing engine 22 is responsible for the maintenance of routing information 42 to reflect the current topology of a network and other network entities to which PE 10A is connected. In particular, routing protocols periodically update routing information 42 to accurately reflect the topology of the network and other entities based on routing protocol messages received by PE 10A.

As shown in FIG. 2, PE 10A may be configured with multiple VRFs including VRF 22A. VRF 22A represents a virtual routing and forwarding instance. VRF 22A manages at least one routing table. An attachment circuit, as shown in FIG. 1, may be associated with a particular VRF, such as VRF 22A, and the particular VRF may be configured to forward traffic for the attachment circuit. In some examples, VRF 22A may represent multiple VRF instances.

Forwarding engines 30A-30N ("forwarding engines 30" or "forwarding units") represent hardware and logic functions that provide high-speed forwarding of network traffic. Forwarding engines 30 typically includes a set of one or more forwarding chips programmed with forwarding information that maps network destinations with specific next hops and the corresponding output interface ports. In general, when PE 10A receives a packet via one of inbound links 58, one of forwarding engines 30 identifies an associated next hop for the data packet by traversing the programmed forwarding information based on information within the packet. One of forwarding engines 30 (either the ingress forwarding engine or a different egress forwarding engine) forwards the packet on one of outbound links 60 mapped to the corresponding next hop.

In the example of FIG. 2, forwarding engine 30A includes forwarding information 56. In accordance with routing information 42, forwarding engine 30A maintains forwarding information 56 that associates network destinations with specific next hops and corresponding interface ports. For example, routing engine 22 analyzes routing information 42 and generates forwarding information 56 in accordance with routing information 42. Forwarding information 56 may be maintained in the form of one or more tables, link lists, radix trees, databases, flat files, or any other data structures.

Forwarding engine 30A maintains forwarding information 56 for each Ethernet VPN Instance (EVI) established by PE 10A to associate network destinations with specific next hops and the corresponding interface ports. As described an FIG. 1, an EVI may be associated with one or more Ethernet Segments in an EVPN. In general, when PE 10A receives a data packet on an LSP of a given Ethernet segment via one of inbound links 58, forwarding engine 30A, for example, identifies an associated next hop for the data packet by traversing forwarding information 56 based on information (e.g., labeling information) within the packet. Forwarding engine 30A forwards the data packet on one of outbound links 60 to the corresponding next hop in accordance with forwarding information 56 associated with the Ethernet segment. At this time, forwarding engine 30A may push and/or pop labels from the packet to forward the packet along a correct LSP.

Routing engine 22 also includes an EVPN module 48 having flooding module 54 that performs flooding and a learning module 52 that performs layer two (L2) learning, e.g., learning of customer device MAC addresses from inbound Label Switch Paths (LSPs) and association of those customer MAC addresses with corresponding outbound LSPs and output interfaces. EVPN module 48 may maintain MAC tables 50 for each EVI established by PE 10A, or in alternative examples may maintain one or more MAC tables that are independent of each respective EVI. Learning module 52 and flooding module 54 may alternatively be configured for execution, in full or in part, by forwarding engine 30A. In some examples, EVPN module 48 may be part of or executed by routing process 45.

Signaling module 40 outputs control-plane messages to automatically establish LSPs, Ethernet Segments, and otherwise provision one or more EVPNs between PE 10A and each of the other PE routers 10. Signaling module 40 may signal the PE routers 10 using one or more suitable L3 protocols, such as the BGP. Signaling module 40 can communicate with forwarding engine 30A to automatically update forwarding information 56. In some examples, signaling module 40 may be part of or executed by routing process 45.

EVPN module 48 executes in the control plane of PE 10A and performs MAC address learning to automatically update portions of forwarding information 56 for each EVI established by PE 10A. In some examples, EVPN module 48 is invoked when PE 10A receives data packets on the LSPs established by router PE 10A for one or more of the PE 10 that are members of an EVI. EVPN module 48 performs MAC address learning using learning module 52 and updates the one of MAC tables 50 to initially record associations between the LSPs connected to PE 10A and the source MAC addresses of the EVPN customer devices from which the data packets were received on the LSPs. For example, the one of MAC tables 50 records LSP identifiers that identify the LSPs connected to PE 10A, and records MAC addresses that identify the source customer devices of the data packets transmitted over the LSPs. In effect, router PE 10A, an L3 routing device (or in some examples, an L2 switching device), learns associations between MAC addresses and LSPs (which are mapped to ports or interfaces), much as an L2 switch learns associations between MAC addresses and ports. Forwarding information 56 may represent a virtual port binding and bridging table.

In order to update the one of the MAC tables 50, learning module 52 of EVPN module 48 in routing engine 22 performs L2 learning and association of L2 customer MAC addresses with specific LSPs. Learning module 52 then communicates information recorded in the one of MAC tables 50 to configure forwarding information 56. In this way, forwarding engine 30A may be programmed with associations between each LSP and output interface and specific source customer MAC addresses reachable via those LSPs. EVPN module 48 may communicate with forwarding engines 30 to update the one of MAC tables 50 associated with the EVPN to associate the customer MAC addresses with the appropriate outbound LSP. In some examples, forwarding engine 30A may maintain local MAC tables (not shown). After the update, MAC tables 50 include associations between the LSPs connected to PE 10A that are used to transport L2 traffic to the MAC addresses of the customer devices. In other words, MAC tables 50 records associations between the LSPs and the network devices to which data packets may be sent on the LSPs. For example, MAC tables 50 may record LSP identifiers that identify the LSPs sourced by PE 10A, and for those LSP identifiers that identify the MAC addresses of the reachable customer devices.

Forwarding engine 30A receives data packets on inbound links 58 that are destined for one of the PE routers in the EVPN. Forwarding engine 30A determines whether the destination customer MAC address of the data packets is included in the one of MAC tables associated with the EVPN. If the MAC address is included in the one of MAC tables, then PE 10A forwards the data packets to the destination PE router on the LSP associated with the MAC address based on forwarding information 56 associated with the EVPN. If the customer MAC address is not included in the one of MAC tables, PE 10A floods the data packets to all of the PE routers via the LSPs based on forwarding information 56 associated with the EVPN. Example details of MAC learning by a router are further described in U.S. patent application Ser. No. 12/246,810, "INTER-AUTONOMOUS SYSTEM (AS) VIRTUAL PRIVATE LOCAL AREA NETWORK SERVICE (VPLS)," filed on Oct. 7, 2008, the entire contents of which are incorporated herein by reference.

EVPN module 48 additional manages the EVPN multi-homing mode of operation for PE 10A. That is, EVPN module 48 operates to maintain EVPN service and traffic forwarding to and from CEs multi-homed to PE 10A and one or more other routers (e.g., PE 10B in the example topology of FIG. 1). For example, in the event of a network failure such as a PE 10A, 10B to CE 8 link 15A, 15B failure; a failure of any of PEs 10A, 10B; or an MPLS-reachability or other type of tunneling failure between any of PEs 10A, 10B and the remote PE 10; EVPN module 48 coordinates with PE 10B to ensure that one of PEs 10A, 10B is in an active mode and the other is in a standby mode. EVPN module 48 may coordinate with PE 10B to elect a new designated forwarder for Ethernet segment 14.

VRF 22A is further configured with a routing interface of IRB 19A, the logical interfaces for which are installed (or "configured") to forwarding information 56 of forwarding engine 30A. Kernel 43 includes an interfaces table 49 ("interfaces 49") that represents a data structure that includes a corresponding entry for each logical interface configured for PE 10A. Interfaces 49 includes an entry for IRB 19A. Entries for respective logical interfaces may specify respective current information describing the logical interfaces. Current information for a logical interface may include state information to indicate the interface state whether the logical interface is capable ("up") of sending/receiving packets or is not capable ("down"); and blocking information to indicate a forwarding state of the logical interface (e.g., "unblocked" to indicate traffic is forwarded on the interface or "blocked" to indicate traffic is not being forwarded on the interface). In some examples, IRB 19A is configured to be in the "down" state when the PE 10A is a standby multi-homing PE router for an EVI that is configured with IRB 19A. In some examples, IRB 19A is configured to be in the "blocking" state when the PE 10A is a non-designated forwarder for the EVI.

Kernel 43 also executes ARP 51 and/or NDP 53 to generate and inject an ARP request 70 and/or NDP neighbor solicitation 72 into the data plane for output via IFCs 32.

VRF 22A for the EVPN instance illustrated in FIG. 1 is configured with a static route 41. Static route 41 may, for example with respect to the topology illustrated in FIG. 1, specify, as a next hop for L3 subnet 7, the IP address for the routing interface of IRB 9 configured in CE 8. For example, static route 41 may be configured according to a following statement: set static route subnet-X next-hop CE_IRB_IP, where CE_IRB_IP is the IP address of IRB 9 configured on CE 8 to reach subnet-X (L3 subnet 7).

According to techniques described herein, routing process 45 executing BGP 46 determines to advertise static route 41 based on the EVPN mode of operation for PE 10A for the EVPN instance that includes CE 8 and to which PE 10A bridges EVPN traffic using IRB 19A. Routing process 45 advertises, using BGP 46, static route 41 to PE 10C only if PE 10A is in active mode for multihomed CE 8.

To determine whether PE 10A is in active mode, routing process 45 may use ARP to determine whether the logical interface, IRB 19A, for the EVPN instance for the PE 10A to CE 8 link is in a "down" state or an "up" state. If IRB 19A is in a down state (or "kernel down state"), routing process 45 does not advertise (or suppresses) the static route 41. If IRB 19A is in an up state (or "kernel up state"), routing process 45 advertises static route 41 using BGP 46 to PE 10C. As a result, PE 10C sends packets to the PE 10A, 10B that is in active mode.

Figure 3:
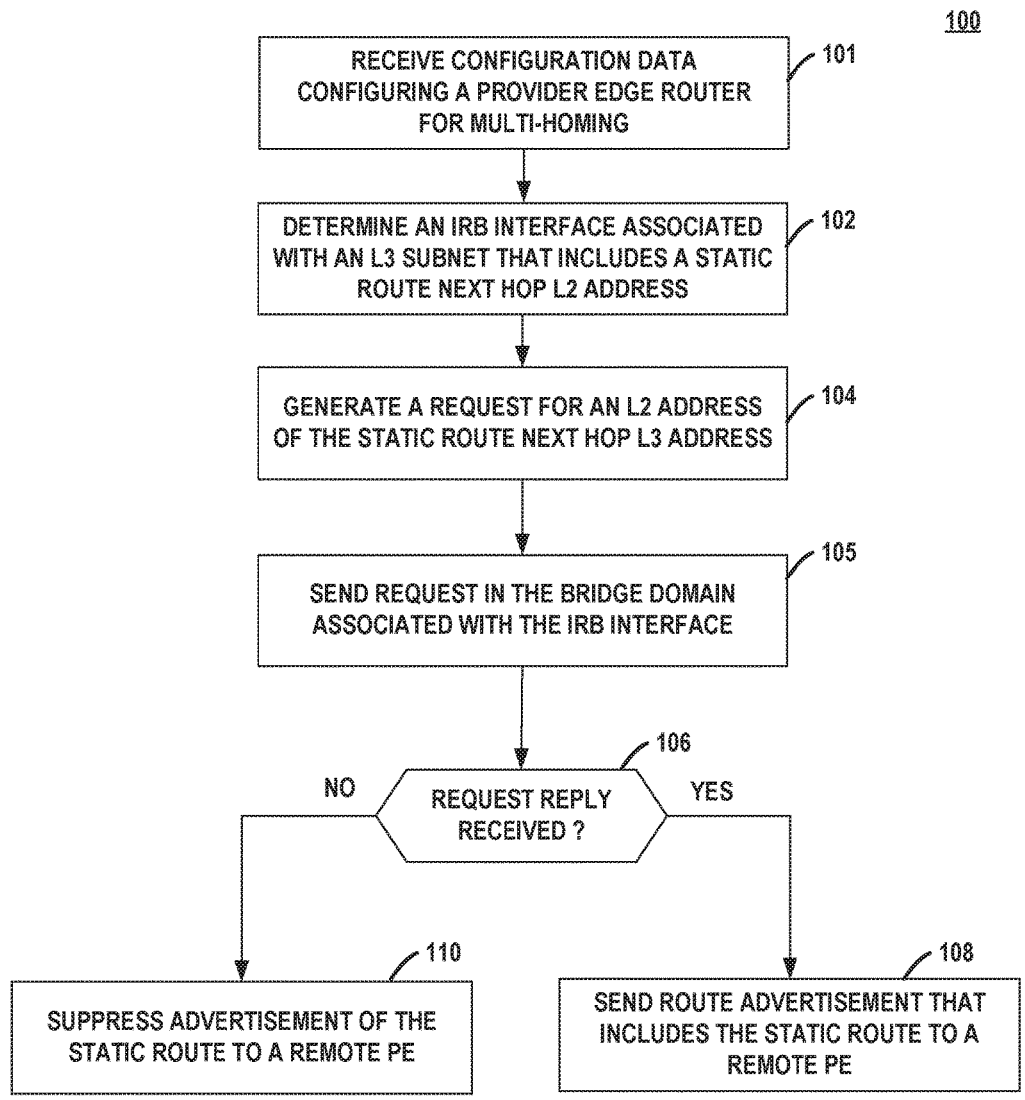
FIG. 3 is a flowchart illustrating an example mode of operation for a provider edge network device to advertise or suppress a static route for an EVPN instance, according to techniques described herein.

FIG. 3 is a flowchart illustrating an example mode of operation for a provider edge network device to advertise or suppress a static route for an EVPN instance, according to techniques described herein. PE 10A receives configuration data configuring the PE 10A to multi-home CE 8 for an EVI (101). An EVI for VRF 22A may have multiple associated IRBs, including IRB 19A. PE 10A determines that IRB 19A of the one or more IRBs for the EVI for VRF 22A has a gateway L3 (e.g., IP) address (or routing interface L3 address) that shares a bridge domain L3 subnet with the gateway IP address for IRB 9 of CE 8 (102). Put another way, PE 10A finds the IRB of the one or more IRBs (here, IRB 19A) with a logical interface gateway IP address that shares an L3 subnet with the gateway IP address for IRB 9 of CE 8. This indicates that IRB 19A is the outbound logical interface of PE 10A for IRB 9 of CE 8.

PE 10A generates a request for an L2 address for the gateway IP address of IRB 9, the request being generated output on the bridge domain that IRB 19A is a part of (or is an interface for), which is VLAN 11A in the example configuration of FIG. 1 (104). The request may include, for instance, an ARP request or an NDP neighbor solicitation. PE 10A may output the request for the L2 address on the bridge domain in some instances (105). In some cases, the routing process 45 requests that kernel 43 generate the request for the L2 address and inject the request for the L2 address into one of forwarding engines 30. Kernel 43 may determine, from interfaces 49, that the PE 10A to CE 8 link is in a down state or is blocking, in which instances kernel 43 drops the request from routing process 45.

If PE 10A receives a response to the request for the L2 address for the IRB 9 gateway IP address (YES branch of 106), the IRB 9 gateway IP address is reachable and this indicates that PE 10A is in active mode for the EVI that includes IRB 19A. PE 10A therefore advertises static route 41 to remote PE 10C in route advertisement 5 (108).

If, however, PE 10A does not receive a response to the request for the L2 address for the IRB 9 gateway IP address (NO branch of 106), the IRB 9 gateway IP address is not reachable and this indicates that PE 10A is in standby mode for the EVI that includes IRB 19A. PE 10A therefore suppresses and does not advertise static route 41 to remote PE 10C (110).

PE 10A may perform the above mode of operation in response to various events. For example, PE 10A may perform the above mode of operation in response to switching from active to standby, or vice-versa. PE 10A may perform the above mode of operation in response to being configured with the EVI that includes IRB 19A. PE 10A may perform the above mode of operation in response to being configured to offer multi-homed virtual bridge connectivity, with PE 10B, to CE 8.

In some cases, CE 8 is configured with IRB 9 having the gateway IP address in the bridge domain for IRB 19A subsequent to being multi-homed. In such cases, PE 10A may receive gratuitous ARP replies for the gateway IP address and match the gateway IP address to the next-hop specified for static route 41 (for instance). Because these IP addresses match, this indicates that PE 10A is in active mode for the EVI associated with IRB 19A, and PE 10A may therefore advertise static route 41 in route advertisement 5. A gateway IP address is an L3 address.

Figure 4:
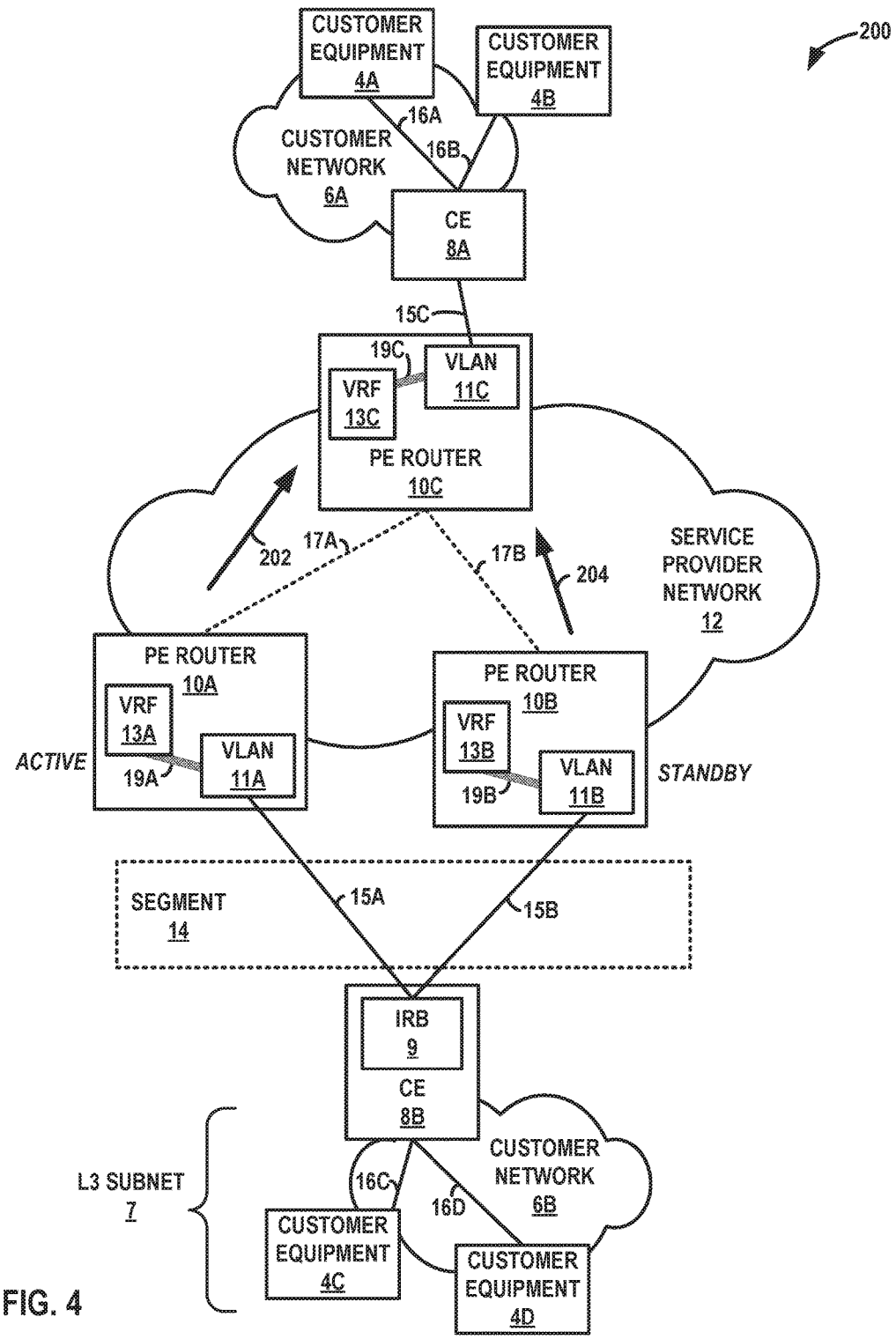
FIG. 4 is a block diagram illustrating an example system, in accordance with techniques of the disclosure.

FIG. 4 is a block diagram illustrating an example system, in accordance with techniques of the disclosure. System 200 is configured in a substantially similar topology to that of system 2 of FIG. 1 and illustrates an EVPN active-standby with a L3VPN deployment model. In this model, multi-homed PEs 10A, 10B are used to provide L3VPN as well as L2VPN service, and IRB interfaces are used to bind the L3VPN and EVPN together.

In this scenario, with N customer VRFs (L3VPNs), service carving is done using the EVPN active-standby model in such a way that, on average, PE 10A is a designated forwarder (DF) for one half of the customer VRFs and another PE 10B is designated forwarder for the other half number of VRFs. With this deployment, when static routes are configured under the VRFs and advertised via BGP to the remote PE 10C (according to the L3VPN concept), both the multi-homing PEs 10A, 10B (DF and non-DF) advertise the static route towards the remote PE. Remote PE on receiving the route update runs BGP path selection algorithm and selects one of the static routes, which may in many cases have been advertised by the non-DF and lead to black holing. That is, in EVPN Active-standby the CE 8-facing interfaces in the non-DF are in "blocking" state. When the remote PE attempts to send traffic using the selected route from non-DF, such traffic is black holed at the non-DF. In a typical customer use case, with N VRFs, each VRF having one static route; when remote PE 10C sends traffic destined to all the static routes in N VRFs, ~50% traffic gets black holed.

For instance, any of the PEs 10A, 10B may be configured with the following example configuration:

```
routing-instances {
    L3VPN0-1 {
        instance-type vrf;
        interface irb.1801;
        route-distinguisher 1:3800;
```

-continued

```
        vrf-target target:1:3800;
        vrf-table-label;
        routing-options {
            static {
                route 1.0.0.0/24 next-hop 109.0.1.2;
            }
        }
    }
},
``` where the static route in the LVPN0-1 VRF points to an IRB 9 next-hop of the CE 8.

In this example, PEs 10A, 10B in accordance with techniques described herein each operates to advertise a higher local preference when advertising a static route for an L3VPN for which the PE router is a designated forwarder. Internal BGP (IBGP) sessions use a metric called the local preference, which is carried in IBGP update packets in the path attribute LOCAL_PREF. When an autonomous system (AS) has multiple routes to another AS, the local preference indicates the degree of preference for one route over the other routes. The route with the highest local preference value is preferred for route selection.

In the example of FIG. 4 in which PE 10A is a DF for VRF 13, PE 10A sends a route advertisement 202 that includes the static route specifying CE 8. PE 10B operating as a non-DF sends a route advertisement 204 that includes the static route specifying CE 8. Because PE 10A is a DF, routes carried in route advertisement 202 are indicated in the advertisement as more preferred that are routes carried in route advertisement, for instance, by marking the path attribute LOCAL_PREF with a relatively higher value.

PE 10C receives route advertisements 202, 204 and select the best path towards the DF in accordance with the BGP path selection algorithm, for instance. Remote PE 10C therefore sends traffic to the DF PE 10A (not to non-DF PE 10B), thereby avoiding a traffic black hole when service carving is done between multi-homing PEs. In case of a network failure that results in a change in the DF role, whereby the previous DF now becomes a non-DF and vice-versa, the previous DF PE 10A sends a new route advertisement to update the static route with a default local preference value for the L3VPN (static) routes originated by the PE 10. At this point, the new DF PE 10B sends a new route advertisement to update the static route with a higher local preference value for the L3VPN (static) routes originated by PE 10B.

Figure 5:
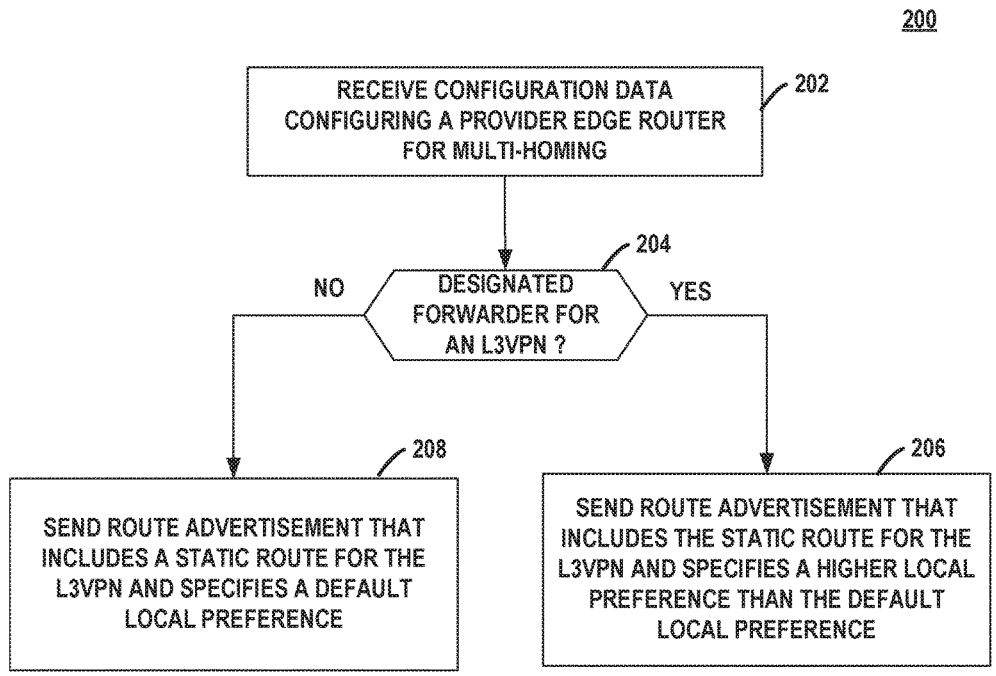
FIG. 5 is a flowchart illustrating an example mode of operation for a provider edge network device to advertise a static route for an L3VPN, according to techniques described herein.

FIG. 5 is a flowchart illustrating an example mode of operation for a provider edge network device to advertise a static route for an L3VPN, according to techniques described herein. PE 10A receives configuration data configuring the PE 10A to multi-home CE 8 for an L3VPN (202).

If PE 10A is a designated forwarder for the L3VPN (YES branch of 204), PE 10A advertises a static route for the L3VPN, providing reachability to CE 8, to remote PE 10C in route advertisement 202 that specifies a higher local preference that is the default local preference for PE 10A (206). If PE 10A, however, is not a designated forwarder for the L3VPN (NO branch of 204), PE 10A advertises a static route for the L3VPN, providing reachability to CE 8, to remote PE 10C in route advertisement 204 that specifies the default local preference for PE 10B (204). PE 10C therefore imports the static route advertised by PE 10 and directs traffic for the L3VPN to the DF PE 10A, thus avoiding black holing at PE 10B.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

What is claimed is:

1. A method comprising:
   receiving, by a provider edge router of an intermediate layer 3 network, configuration data configuring the provider edge router to provide multi-homed layer 2 virtual bridge connectivity to a local customer edge device using an active-standby mode of operation; and
   sending, by the provider edge router to a remote provider edge router in response to determining the provider edge router can send layer 2 packets to the local customer edge device, a route advertisement that includes a static route specifying a layer 3 address of the local customer edge device as a next-hop for a layer 3 subnet.

2. The method of claim 1,
   wherein the configuration data further configures the provider edge router with an integrated routing and bridging (IRB) interface, and
   wherein determining the provider edge router can send layer 2 packets to the local customer edge device comprises determining, by the provider edge router, the IRB interface has a layer 3 subnet that includes the layer 3 address of the local customer edge device.

3. The method of claim 2,
   wherein the configuration data further configures the provider edge router with an Ethernet Virtual Private Network (EVPN) instance for an EVPN that includes the local customer edge device to provide the multi-homed layer 2 virtual bridge connectivity to the local customer edge device using the active-standby mode of operation, and
   wherein the configuration data further configures the IRB interface as a routing interface for the EVPN instance.

4. The method of claim 2, wherein determining the provider edge router can send layer 2 packets to the local customer edge device comprises:
   generating, by the provider edge router, a request for a layer 2 address for the layer 3 address of the local customer edge device, the request being generated for output on a bridging domain of the IRB bridging interface; and
   receiving, by the provider edge router from the local customer edge device, a reply to the request.

5. The method of claim 4, wherein the request for a layer 2 address for the layer 3 address of the local customer edge device comprises one of an Address Resolution Protocol request and a Neighbor Discovery Protocol neighbor solicitation.

6. The method of claim 4, wherein the bridging domain comprises a virtual local area network.

7. The method of claim 1, wherein determining the provider edge router can send layer 2 packets to the local customer edge device comprises:
   generating, by the provider edge router, a request for a layer 2 address for the layer 3 address of the local customer edge device; and
   receiving, by the provider edge router from the local customer edge device, a reply to the request.

8. The method of claim 1, wherein the layer 3 address of the local customer edge device comprises a gateway L3 address for an integrated routing and bridging (IRB) interface, configured in the local customer edge device, that provides reachability to a layer 3 subnet in a customer network that includes the local customer edge device.

9. The method of claim 1, wherein determining the provider edge router can send layer 2 packets to the local customer edge device comprises determining, by the provider edge router, the provider edge router is an active multi-homing provider edge router for the local customer edge device.

10. The method of claim 1, wherein determining the provider edge router can send layer 2 packets to the local customer edge device comprises determining, by the provider edge router, the provider edge router is a designated forwarder provider edge router for the local customer edge device.

11. The method of claim 1,
wherein the configuration data comprises first configuration data,
wherein the local customer edge device comprises a first local customer edge device,
wherein the remote provider edge router comprises a first remote provider edge router,
wherein the static route comprises a first static route, and
wherein the route advertisement comprises a first route advertisement, the method further comprising:
receiving, by the provider edge router, second configuration data configuring the provider edge router to provide multi-homed layer 2 virtual bridge connectivity to a second local customer edge device using an active-standby mode of operation; and
sending, by the provider edge router to a second remote provider edge router in response to determining the provider edge router is an active multi-homing provider edge router for the second local customer edge device, a second route advertisement, according to a routing protocol, that includes a second static route specifying a layer 3 address of the second local customer edge device and indicates the second static route has a higher local preference for the routing protocol than a default local preference of the provider edge router.

12. A non-transitory computer-readable medium comprising instructions for causing one or more programmable processors of a provider edge router of an intermediate layer 3 network to:
receive configuration data configuring the provider edge router to provide multi-homed layer 2 virtual bridge connectivity to a local customer edge device using an active-standby mode of operation; and
send, to a remote provider edge router in response to determining the provider edge router can send layer 2 packets to the local customer edge device, a route advertisement that includes a static route specifying a layer 3 address of the local customer edge device as a next-hop for a layer 3 subnet.

13. A network device comprising:
one or more processors operably coupled to a memory,
wherein the one or more processors are configured to receive configuration data configuring the network device as a provider edge router of an intermediate layer 3 network to provide multi-homed layer 2 virtual bridge connectivity to a local customer edge device using an active-standby mode of operation, and
wherein the one or more processors are configured to send, to a remote provider edge router in response to determining the network device can send layer 2 packets to the local customer edge device, a route advertisement that includes a static route specifying a layer 3 address of the local customer edge device as a next-hop for a layer 3 subnet.

14. The network device of claim 13,
wherein the configuration data further configures the network device with an integrated routing and bridging (IRB) interface, and
wherein the one or more processors are configured to determine the network device can send layer 2 packets to the local customer edge device by determining the IRB interface has a layer 3 subnet that includes the layer 3 address of the local customer edge device.

15. The network device of claim 14,
wherein the configuration data further configures the network device with an Ethernet Virtual Private Network (EVPN) instance for an EVPN that includes the local customer edge device to provide the multi-homed layer 2 virtual bridge connectivity to the local customer edge device using the active-standby mode of operation, and
wherein the configuration data further configures the IRB interface as a routing interface for the EVPN instance.

16. The network device of claim 14, wherein the one or more processors are configured to determine the network device can send layer 2 packets to the local customer edge device by:
generating a request for a layer 2 address for the layer 3 address of the local customer edge device, the request being generated for output on a bridging domain of the IRB bridging interface; and
receiving, from the local customer edge device, a reply to the request.

17. The network device of claim 16, wherein the request for a layer 2 address for the layer 3 address of the local customer edge device comprises one of an Address Resolution Protocol request and a Neighbor Discovery Protocol neighbor solicitation.

18. The network device of claim 16, wherein the bridging domain comprises a virtual local area network.

19. The network device of claim 13, wherein the one or more processors are configured to determine the network device can send layer 2 packets to the local customer edge device by:
generating a request for a layer 2 address for the layer 3 address of the local customer edge device; and
receiving, from the local customer edge device, a reply to the request.

20. The network device of claim 13, wherein the one or more processors are configured to determine the network device can send layer 2 packets to the local customer edge device by determining the network device is configured as an active multi-homing provider edge router for the local customer edge device.

21. The network device of claim 13, wherein the one or more processors are configured to determine the network device can send layer 2 packets to the local customer edge device by determining the network device is configured as a designated forwarder provider edge router for the local customer edge device.

* * * * *